United States Patent Office 3,408,755
Patented Nov. 5, 1968

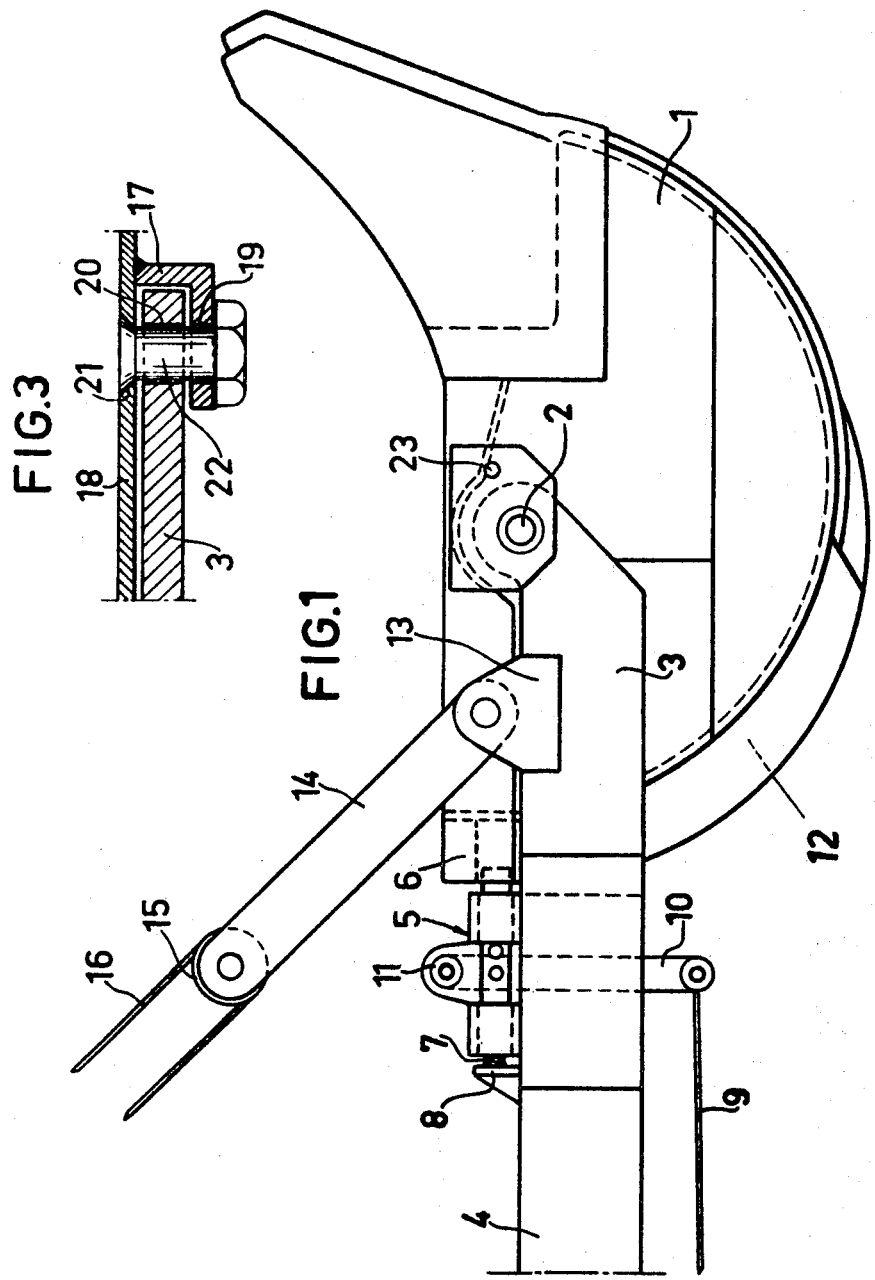

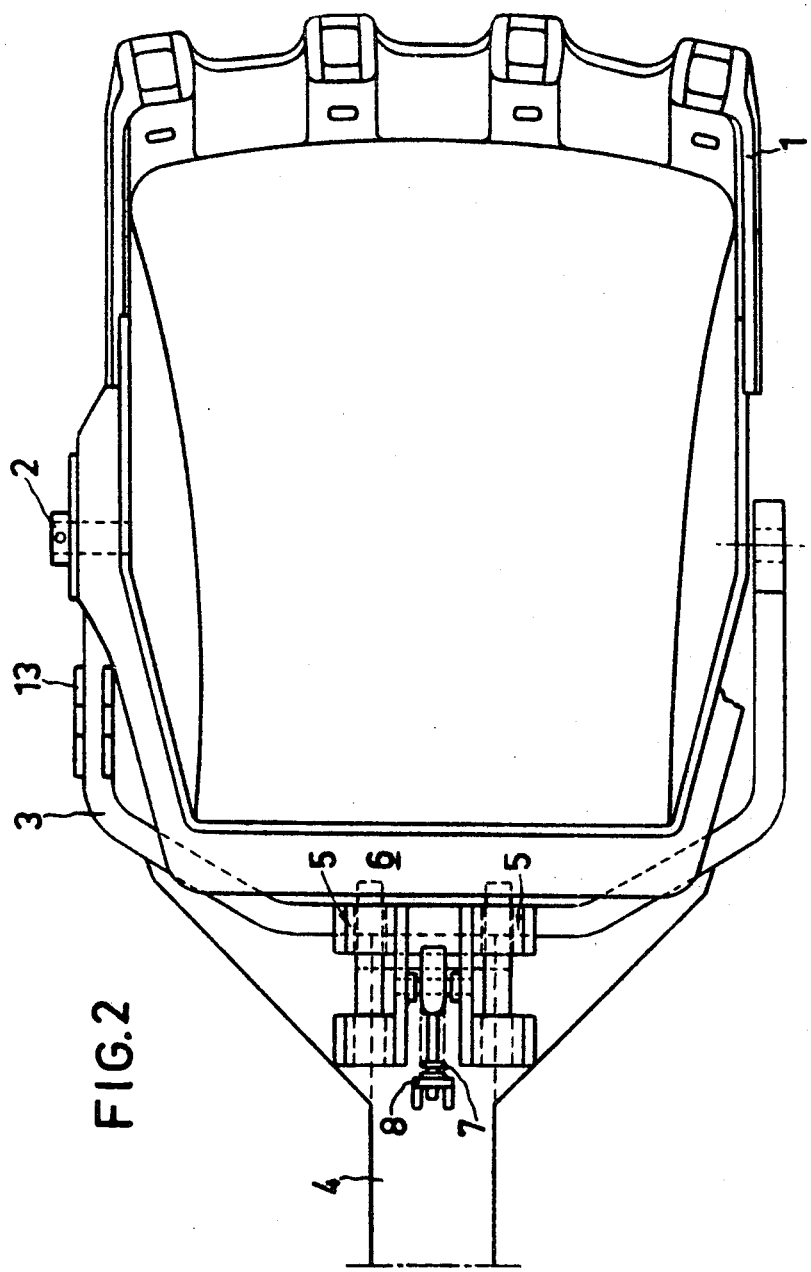

3,408,755
DEVICE FOR VERTICAL EXCAVATORS
Ingvar N. Vikström, Saltsjo-Duvnas, Sweden, assignor to Effco S. Franzen & Co. Aktiebolag, Stockholm, Sweden, a corporation of Sweden
Filed July 19, 1965, Ser. No. 472,874
1 Claim. (Cl. 37—138)

ABSTRACT OF THE DISCLOSURE

This invention relates to a shovel having means to pivotally mount the shovel, means to lock the shovel in a first position, means to unlock the shovel and means to move the shovel assembly wherein the means to lock the shovel comprises a bar carried by the supporting means and a rail having a catch carried by the shovel.

---

This invention relates to a device for vertical excavators, preferably intended for excavating rock and comprising a shovel operated by hoist wires, a jib and an arm.

These types of excavators were previously equipped with a shovel which emptied through the bottom, i.e. the bottom of the shovel was provided with a hinged plate which was released by a movable locking bar to empty the shovel. In that case the load passed through the shovel only if the lump size of the load allowed it to so pass. As excavators of this type preferably are adapted and used for rock excavating, it is easily realized, that serious problems arose when the blasting resulted in large-size lumps or boulders, since they could not pass through the shovel without getting stuck therein.

This shortcoming is eliminated by the present invention. Since the rock grabbed need not pass through the shovel, no problems of removing stuck boulders and the like arise. The shovel is pivotally mounted at a bow in a point behind its center of gravity. The shovel, thus, tends to tip forward even when it is empty. In the loaded state of the shovel this tendency is still accentuated, as the load preferably falls into the front portion of the shovel. The locking member comprises one or more spring-loaded locking bars which are inserted into corresponding catches in the back of the shovel to lock the shovel. The invention is substantially characterized in that the hoist wires operate via pulleys, wheels or the like arranged in the upper end of a yoke which at its lower end is pivoted at a bow wherein the shovel is pivotally supported at a point behind its center of gravity so that the shovel tips forward to be emptied. Furthermore, it is advantageous to provide the underside of the shovel with guides along which the locking bars run after their release from the catch when the shovel is being emptied or tipped. Thereby a simple and reliable locking device is obtained which operates safely even under difficult work conditions.

An embodiment of the invention will be explained below wherein reference is made to the accompanying drawings whereon FIG. 1 shows a side view of the shovel, FIG. 2 a view seen from above, and FIG. 3 a detail view of the support of the shovel.

The shovel 1 is pivotally supported at 2 in a bow 3 welded to the outer end of the arm 4. The centre of gravity of the shovel is designated by 23. Also the locking member 5 is mounted at the outer end of the arm and comprises locking bars inserted into the catch 6. The locking bars are kept in their inserted position by the spring 7 anchored against a head 8. The locking member is released by pulling the wire 9. The wire is fixed in a lever 10 pivoting around a journal 11. Upon pulling the wire 9 the locking bars participate in the backward movement so that the shovel is released from its locked position and thereby tips forward. As soon as the pull of the wire ceases the locking bars are brought into a forward position by the spring 7 and will then slide against the guides 12 arranged on the lower surface of the shovel. After the shovel is emptied it is moved additionally some distance downwards and backwards so that its center of gravity is located straight below the locking member and the catch. The locking bars will then snap into the catch and, thus, be locked, whereafter the shovel is ready for the next working cycle.

The shanks of the bow 3 are provided with lugs 13 wherein a yoke 14 is pivotally arranged. In the upper end of the yoke wheels 15 are arranged with hoist wires 16 running about the same.

The support of the shovel comprises a clamp 17 welded to the side wall 18 of the shovel. The clamp 17, the shank of the bow 3 and the side wall 18 are provided with holes 19, 20 and 21, respectively through which a bolt 22 is threaded.

What I claim is:
1. In an excavator a shovel pivotally mounted in a bow said bow being fixedly attached to an elevating arm of the excavator at a point behind the plane of the center of gravity of the shovel, means to lock the shovel in a locked first position wherein it is adapted to dig and carry material said locking means comprising laterally spaced catches carried by the shovel and correspondingly spaced movable bars actuated by a single spring and carried by the end of the arm facing against the shovel, means to unlock the shovel, means to move said arm and the shovel comprising a yoke pivotally attached at its first end to said bow and having a pulley attached to its second end which pulley engages hoist wires adapted to hoist said arm and said shovel, and means to guide the bars of the locking means during the unlocked movement of the shovel, wherein the means to guide the locking bars comprises guide bars fixedly attached to the under side of the shovel and extending to the catches to automatically guide the locking bars into engagement with the catches during the movement of the shovel from an unlocked second position and to the locked first position.

References Cited
UNITED STATES PATENTS

| | | | |
|---|---|---|---|
| 964,042 | 7/1910 | Moore | 214—146 |
| 1,518,314 | 12/1924 | Downie | 214—145 |

ABRAHAM G. STONE, *Primary Examiner.*

A. E. KOPECKI, *Assistant Examiner.*